May 8, 1945.　　　　E. I. VALYI ET AL　　　　2,375,334
METHOD OF PRODUCING REINFORCED METAL SHEETS
Filed Aug. 7, 1941
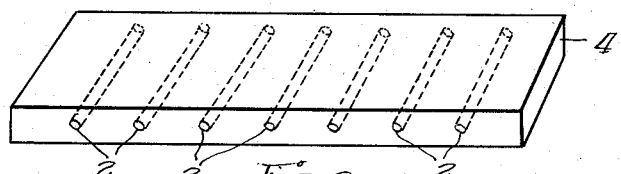
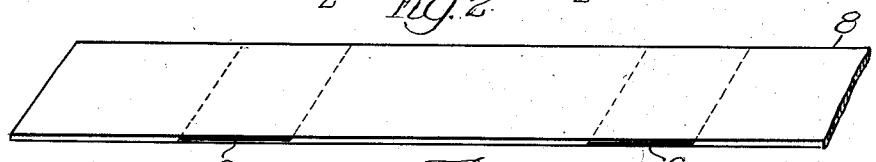
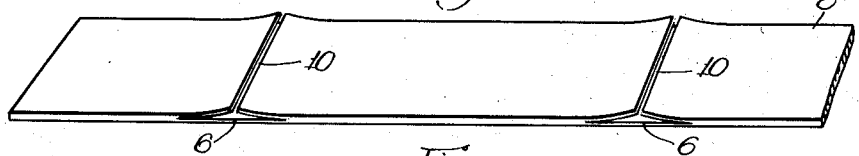
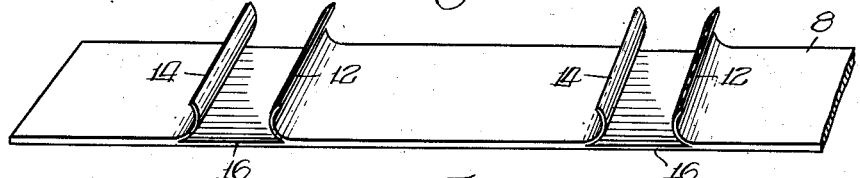
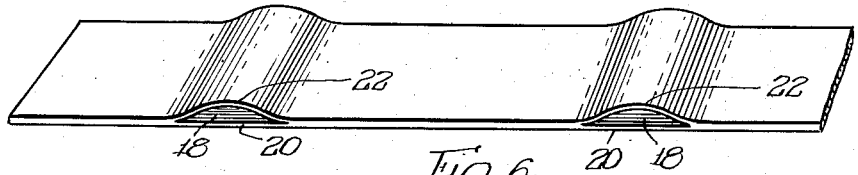
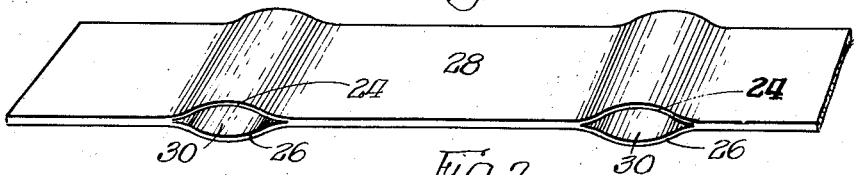
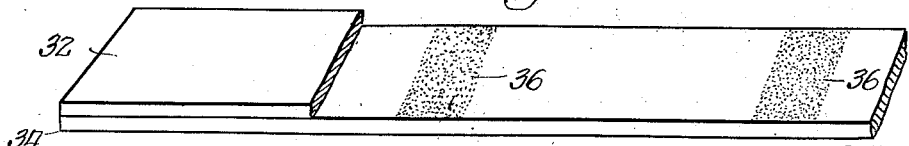
INVENTORS.
Emerik I. Valyi,
Sam Tour,
BY Patented May 8, 1945

2,375,334

UNITED STATES PATENT OFFICE 2,375,334

METHOD OF PRODUCING REINFORCED METAL SHEETS

Emerik I. Valyi and Sam Tour, New York, N. Y.

Application August 7, 1941, Serial No. 405,778

7 Claims. (Cl. 29—155)

This invention relates to new and improved metal structures, more particularly new and improved reinforced metal sheets and a method for the manufacture thereof.

In many instances structural carrying members such as beams, trusses, girders and the like have to be connected with sheet metal in order to obtain continuity of a given surface. For example, in metal aircraft manufacture, a sheet metal cover is provided on wings and body. In the building of railroad cars and truck, van or omnibus bodies, sheet metal has to surround the actual carrying members. In the same way, certain types of tanks for the storage of gases and liquids might be built up of carrying members covered by sheet metal. Under present conditions the aircraft application of this problem is of outstanding importance.

For the structural engineer the sheet metal involved hardly counts from the standpoint of actual load-carry except for the transmission of uniformly distributed loads to the carrying members of the structure. Due to its geometric shape the unit carrying capacity of the sheet metal cover is low. If high load carrying capacity is required, which is the case in aircraft manufacture, the sheet metal cover will have to be protected against undue bending and buckling, even between the comparatively short distances of carrying framework. The methods now in use which will permit the reduction of unwanted deformation of the sheet cover consist in either selecting comparatively short distances between the carrying members, or adding to the system of carrying framework a system of strengthening members on the unexposed surface of the sheet, for example, by riveting or welding small angles or other sections to the back of the sheet.

In airplane construction this problem was solved in certain instances by applying corrugated sheet, and in this way it was possible to build all metal, low wing monoplanes of considerable size in an early stage of their development. The method of using corrugated sheet, however, was mostly abandoned because of the obvious disadvantages with regard to the aerodynamic properties of such corrugated surfaces. Even so, this method demonstrated that the increase of rigidity without the addition of further weight to the sheet metal offered considerable advantages in airplane design. At the same time the method showed that the addition of stiffness at the expense of smoothness of surface will not serve the purpose when not only load carrying capacity, but also top performance in speed and manoeuvrability is required.

One of the objects of the present invention is to provide new and improved types of reinforced metal structures which are characterized by a considerable addition of stiffness both without the addition of excess weight by affixing of stiffening sections and without decrease in aerodynamic efficiency.

Another object of the invention is to provide a new and improved type of unitary reinforced sheet metal.

Still another object of the invention is to provide a new and improved reinforced sheet metal which is substantially smooth or lies in the same plane on one side thereof.

Still another object of the invention is to provide new and improved structures of the character described by a relatively simple method requiring a minimum number of operations.

Another object of the invention is to provide new and improved reinforced structures of the character described by a method which may be carried out readily and simply with presently available equipment.

Other objects of the invention will appear hereinafter.

These objects are accomplished in accordance with this invention by starting with a slab or billet, placing holes or openings therein at predetermined intervals and then rolling the slab or billet into a sheet while taking the precaution, if necessary, to insure that the sheet does not become welded or sealed in the flat slots or openings thereby produced.

The product at the end of this operation is a sheet metal having flat slots or openings therein at predetermined intervals. From this point on the method of producing a reinforced structure may vary somewhat, as will be described hereinafter, depending largely upon the purpose or use for which the structure is intended. One preferred form of operation is to slit one side of the sheet at the laminated part thereof and then to turn up the slit edges, thereby to produce a sheet which is smooth on one side and reinforced on the other side by unitary bent sections occurring at spaced or predetermined intervals.

In another modification of the invention, the laminated sections of the sheet, instead of being cut or slit and then bent, are spread or opened by means of pressure and stretched to produce what might be termed a single faced corrugated structure, that is to say, a structure which is smooth on one side and corrugated on the other. In another modification of the invention, the metal sheet, instead of being slit and bent, may be opened by means of pressure, or by means of a suitable tool, to produce a double faced corrugated structure. In this event, however, the sheet will not be smooth on one side.

Another feature of the invention resides in the preparation of a bimetallic sheet. This sheet is made by joining together two or more metal sheets of identical or different chemical composition to produce a laminated structure with the laminations at spaced intervals and then opening up the laminations in any one of the ways previously described. The method here is somewhat different in that it is unnecessary to make holes or openings in the slabs or billets. One of the sheets of metal is coated at intervals with compounds or substances which will keep it from sealing to the other sheet at the coated areas but will not prevent it from sealing or welding to the other sheet in uncoated areas. Then when the sheets are rolled together a laminated structure is produced at the coated areas which can be converted into a reinforced structure in the manner previously described.

Other features and advantages of the invention will be apparent by reference to the following description in conjunction with the accompanying drawing in which:

Figure 1 represents a slab or billet of sheet metal having holes or openings therein;

Figure 2 represents the same slab or billet after it has been rolled to thereby produce a laminated structure in which the holes or openings of Figure 1 are converted to laminations in the form of slits or slots;

Figure 3 illustrates the laminated sheet of Figure 2 in which one side of the laminated structure has been sawed, severed or cut;

Figure 4 illustrates the subsequent operation and structure in which the severed edges of the structure shown in Figure 3 have been bent or turned inwardly or upwardly;

Figure 5 illustrates a modified form of a reinforced structure made by pressing a tool or exerting hydraulic pressure between the laminations or slits of the structure shown in Figure 2 to thereby stretch the inner part of the sheet inwardly or upwardly, but without severing it;

Figure 6 represents another embodiment of the invention in which the laminated structure is opened in a manner similar to that shown in Figure 5 except that both sides of the laminations are extended so that there is no longer a plane surface on one side, as in the case of Figure 5;

Figure 7 illustrates the manner in which a bimetallic structure is made.

Referring now to Figure 1, it will be seen that in accordance with a preferred embodiment of the invention, the first step of the process consists in boring, drilling, piercing or otherwise forming holes or openings 2 at predetermined spaced intervals in a metal slab or billet 4.

The resultant structure is then subjected to rolling to produce a sheet metal product, as shown in Figure 2, in which the holes 2 are now converted to laminations 6 and the slab 4 is now a sheet 8.

In the third step of this embodiment of the invention one side of each of the laminations 6 is severed or cut along lines of severance 10, as shown in Figure 3.

Finally, in the fourth step of this embodiment of the invention the cut edges 10 are turned or bent in a manner shown in Figure 4 to produce the reinforcing members 12 and 14. The opposite side 16 of the sheet 8 is still substantially smooth, that is to say, it lies in the same plane, and hence, the structure thereby produced is a reinforced structure having one plane surface. This type of structure is especially important for use in aircraft construction, or in any other type of reinforced structure where one of the surfaces is required to be plane in order to offer a minimum resistance to the flow of air or other fluids.

In making the embodiment of the invention illustrated in Figure 5, the laminations 6 of the sheet 8 of Figure 2 are not severed along the lines of severance 10, as shown in Figure 3, but are opened and stretched inwardly by any mechanical or hydraulic means, thereby producing holes or openings 18. The opposite side 20 of the metal sheet is kept substantially plane. This type of structure is only possible by stretching the opened portions 22 provided that the side 20 is not changed. Care has to be taken that side 20 remain substantially plane, for example, by holding it firmly against a plate while stretching side 22.

In the embodiment of the invention shown in Figure 6, the slits or laminations 6 of the sheet metal shown in Figure 2 are open or bent outwardly, on both of the sides 24 and 26 to produce a metal structure resembling somewhat a double faced corrugated board with the exception that those portions 28 of the sheet in between the openings 30 are unitary. In this type of structure, none of the surfaces will be flat or lie in the same plane. The structures described in Figure 5 are useful in the aircraft industry. Both structures described in Figures 5 and 6 may be used, for example, in heat-exchangers wherein a heating or cooling substance is passed through the holes 18 or 30, respectively, while at the same time the sheet is reinforced due to its shape.

In the embodiment of the invention illustrated in Figure 7, the metal slab 32 is composed of one metal and the slab 34 of another metal. Both slabs 32 and 34 may also have the same chemical composition. At least one of these slabs is treated with a substance which will prevent it from being welded or sealed to the other slab when they are rolled together. The treating substance may vary rather widely, depending upon the composition of the two metals. In general, it is well known in the art that there are certain substances which will prevent the welding of some metals to other metals, or of one metal to itself. It is not always necessary to add an auxiliary substance because very often it is possible to give the metal an oxidation, or other type of chemical treatment, which will prevent it from sealing either to itself or to another metal.

Where the reinforced structure is composed of a single metal, as in the process described with respect to Figures 1 to 6, the treating substance or the treatment to prevent sealing is applied to the holes 2 of Figure 1 prior to rolling. In the method of Figure 7, wherein there are two or more metals, the treating substance or the treatment is applied in strips along predetermined areas 36, as shown in Figure 7. The resultant product obtained in accordance with the process of Figure 7 consists of a laminated sheet somewhat similar to that of Figure 2 except that the laminations 6 may be composed of different metals and the spaces between the laminations are sealed to each other by the rolling process instead of being formed as a single or unitary piece. The subsequent steps in the process may be the same as those described with reference to Figures 3, 4, 5 and 6 with the production of similar structures except for the metallic composition thereof.

The main problem of producing the laminated structure shown in Figure 2 revolved around the question of whether or not the pierced billets of Figure 1 would still permit a sufficiently steady and continuous flow of material, particularly around the holes and after a certain amount of reduction at the corners formed by flattening the holes. The next problem was to prevent sealing of the holes under the rolling pressure and under the temperatures created by rolling.

To demonstrate the invention, the method was carried out under the most unfavorable conditions and with Duralumin which is not one of the simplest alloys to roll. So far as sealing of the holes was concerned, it was found not too difficult to prevent such an occurrence by oxidizing the metal according to very simple chemical or electrolytic methods. This was accomplished by a commercially available oxidizing mixture composed principally of oxalic acid and sodium carbonate. The oxide layer offered absolute sufficient protection against welding or sealing. Some tests without any particular treatment of the hole surfaces showed that even without any treatment, welding did not generally occur with certain metals such as Duralumin. It has been noted, however, that the separation of the two layers of the resulting slots is no longer easy unless there has been some treatment of the original holes. With the non-ferrous metals such as aluminum, graphite may be employed in order to prevent sealing of the laminations. With steel or nickel, magnesia powder may be employed as an oxidizing agent.

The rolling itself has been carried out in two ways, namely, parallel to the holes and in a transverse direction. Rolling parallel to the holes results in no sizable difference between the diameter of the holes and the width of the slots, while rolling in a transverse direction will produce a difference between the width and the diameter according to the given reduction. Tests carried out on a small cold mill beginning with 1 inch slabs and finishing with sheets having a cross section between .05 inch and .1 inch showed that the flow of material during rolling was of an entirely different nature from that of ordinary rolling. Yet the tests demonstrated an important difference between conditions created by, for instance, porosities or other discontinuities in a slab and by the carefully prepared holes due to the fact that the artificially created discontinuities were entirely symmetrical and apparently would permit a sufficient amount of even distribution of material, whereas, in the case of porosities the disturbance in flow is of a highly localized nature. A certain amount of edge cracking was experienced during the transformation of circular or semi-elliptic hole sections into an actual edge, but even with very narrow strips this edge cracking was inside of reasonable limits.

The tests described were carried out with cold rolling, but the invention is applicable also to the hot rolling of sheets.

The holes in the slabs or billets may be made by any suitable method such as drilling, casting or piercing. Where necessary the interior of the holes may be machined or finished in order to compensate for tapering or for rough inner surfaces.

According to the invention the distance between the slots, or rather between the bent up strips, can be varied to a great extent. The height of the angle formed in the type of structure shown in Figure 4 is governed by the diameter of the hole in the slab in Figure 1 and the total reduction. If the total reduction has to be kept constant in order to obtain a certain quality of sheet, the diameter of the holes may be varied. An important feature of this process is the fact that before opening of the slots the sheet can be formed, that is, drawn, pressed, etc., in the same manner as an ordinary sheet. Opening of the slots after such forming operation saves considerable time and expense in reinforcing curved surfaces such as are used mostly in airplane design.

The opening of the slots may be carried out with portable tools, for example, consisting of a thin steel plate to be pushed between the bottom and cover layer of the laminated structure shown in Figure 2, and a saw blade to cut the cover layer down to said steel plate. Bending can be performed by the same portable tool by adding a guide to follow the steel plate and saw and to actually bend up the cover layer by pressing it with driven rolls against this guide. The rolls will then provide means of propelling the tool.

The invention is applicable to the manufacture of metal structures from all types of metals which can be rolled, including, for instance, copper, aluminum, magnesium, steel, brass, nickel, chromium, and the various alloys. Among the different types of structures made from different metals in accordance with the method of Figure 7 may be mentioned those in which one surface is composed of pure aluminum and the other of Duralumin, and those in which one surface is composed of stainless steel and the other of copper. It will be understood that the treating materials employed to prevent welding may vary with different types of metals.

Having thus described the invention, what we claim as new and desire to secure by Letters Patent of the United States is:

1. A method of making reinforced metal sheets which comprises forming a plurality of holes or openings interiorly from side to side in a metal slab or billet at predetermined intervals, rolling said billet to form a sheet with a plurality of laminations at spaced intervals, severing one side of each of said laminations and bending the severed edges away from the opposed side of each lamination to form a reinforced structure.

2. A method of producing continuous reinforced metallic unitary sheet structures which comprises forming substantially symmetrical holes from side to side through the interior of a relatively thick unitary metal slab of a type suitable for rolling into a continuous sheet, then rolling said slab into a continuous sheet to reduce its cross-sectional area until the sides of said holes are flattened to coincide with each other under conditions preventing said flattened sides of said holes from sealing to each other, thereby forming a continuous unitary sheet with the flattened sides of said holes forming unsealed laminations at spaced intervals separated by and integral with unlaminated metallic areas, severing one side only of said flattened sides from side to side of said sheet and turning the severed edges outwardly to form reinforcing members.

3. A method of producing continuous reinforced metallic unitary sheet structures which comprises forming a plurality of substantially straight tubular holes of substantially uniform diameter at spaced intervals from side to side through the interior of a relatively thick unitary metal slab of a type suitable for rolling into a continuous sheet, then rolling said slab to reduce its cross-sectional area until the sides of said holes are flattened to coincide with each other under conditions preventing said flattened sides of said holes from sealing to each other, thereby producing a continuous sheet with the flattened sides of said holes forming unsealed laminations at spaced intervals separated by and unitary with unlaminated metallic areas, severing one side only of said flattened sides from side to side of said sheet, and turning the severed edges outwardly to form reinforcing members.

4. A method as claimed in claim 2 in which the holes are formed transversely in the metal slab and the slab is rolled longitudinally into a continuous sheet.

5. A method as claimed in claim 2 in which the metal slab is cold rolled into a continuous metal sheet.

6. In a method of producing continuous reinforced metallic unitary sheet structures, the steps which comprise forming holes from side to side through the interior of a relatively thick unitary metal slab of a type suitable for rolling into a continuous sheet, oxidizing the metal comprising the interior surface of said holes, then rolling said slab into a continuous sheet to reduce its cross-sectional area until the sides of said holes are flattened to coincide with each other and expanding at least one of said flattened sides into a reinforced structure.

7. In a method of producing continuous reinforced Duralumin sheets the step which comprises forming holes of substantially uniform cross-section from side to side through the interior of a billet of Duralumin suitable for rolling into a continuous sheet, cold rolling said billet into a continuous sheet to reduce its cross-sectional area until the sides of said holes are flattened to coincide with each other thereby forming a continuous unitary sheet with the flattened sides of said holes forming unsealed laminations at spaced intervals separated by and integral with unlaminated metallic areas, severing one side only of said flattened sides from side to side of said sheet and turning the severed edges outwardly to form reinforcing members.

EMERIK I. VALYI.
SAM TOUR.